Dec. 6, 1932.  R. C. THOMPSON  1,889,881
METHOD OF BENDING GLASS
Filed Sept. 23, 1929
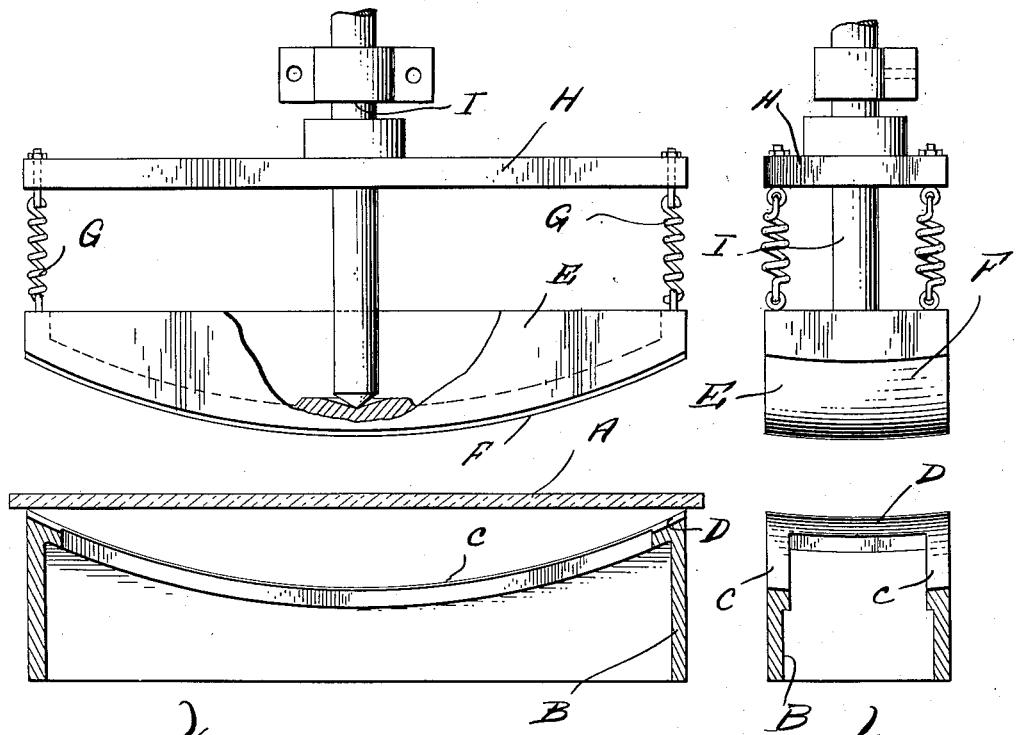
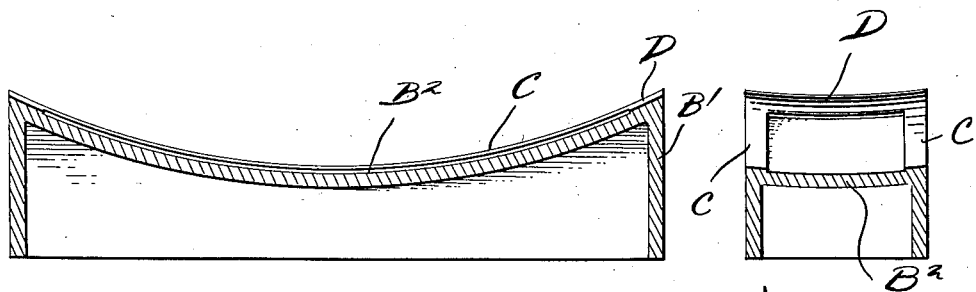
INVENTOR
Ralph C. Thompson
BY
ATTORNEYS Patented Dec. 6, 1932

1,889,881

UNITED STATES PATENT OFFICE

RALPH C. THOMPSON, OF CLEVELAND, OHIO, ASSIGNOR TO THE SIMPLEX PISTON RING COMPANY OF AMERICA, INCORPORATED, OF CLEVELAND, OHIO, A CORPORATION OF OHIO

METHOD OF BENDING GLASS

Application filed September 23, 1929. Serial No. 394,570.

The invention relates to the manufacture of articles of glass to which it is desired to impart an exactly predetermined curvature such for instance as convex or concave mirrors. It is the object of the invention to obtain a method in which the desired curvature may be secured without any injury to the surface of the glass which would interfere with its use as a mirror. With this object in view I have devised a method and an apparatus as hereinafter set forth.

In the drawing:

Figure 1 is a sectional side elevation showing one form of apparatus which may be used to carry out my process;

Figure 2 is a sectional end elevation thereof;

Figures 3 and 4 are views corresponding respectively to Figures 1 and 2 showing a modified construction.

It is a well-known fact that when glass is at a sufficiently high temperature for permanent bending its surface is easily injured by contact with any other body. Thus in the manufacture of articles of pressed glassware which are fashioned in molds fire finishing or some other method of refinishing the surface is necessary to remove mold markings. Where the glass is to be used for optical work any injury to the surface is exceedingly detrimental so that it is usual to grind the surface involving high manufacturing costs.

It is the primary object of my invention to obtain an inexpensive method of forming glass of the desired curvature without injury to the surface thereof and dispensing with the necessity of grinding. This I have accomplished by the following method which is specifically directed to the manufacture of mirrors convex in transverse planes such as are used for rear vision in motor vehicles.

A flat blank of glass A cut to the proper length and breadth is placed upon a member B which has marginal portions C and D respectively of the desired longitudinal and transverse curvatures. This member is then placed in a furnace where the glass is sufficiently heated to become plastic permitting it to sag and gradually conform its marginal portions to the curvature of the portions C and D. When this is accomplished the member B is removed from the furnace and placed in a press or other suitable apparatus for holding it in registration with a plunger E. This is of a corresponding curvature longitudinally and transversely so that when pressed against the glass it will press out any portions not already of the proper form and will clamp the marginal portions of the blank to the portions C and D of the member B. The surface of the plunger E is covered with a coating F of a suitable heat resisting or insulating material such as asbestos which will not injure the glass by contact. Thus the blank will be marginally clamped by the members B and E and held in this position until sufficiently cooled to retain its shape. During this cooling process the contraction of the glass will conform it to the shape of the plunger, but the opposite surface of the glass with the exception of the clamped marginal portions will be free from contact with any other body.

After releasing the clamp the blank is conveyed to the lehr where it is suitably annealed and finally, after annealing, the marginal portions are severed leaving as the finished article only the central portion, the surface of which has been uninjured.

In the modified construction shown in Figures 3 and 4 the member B' extends completely across the blank but is recessed at B² sufficiently to remove its surface from contact with the glass.

The specific construction of the press or the means for registering the plunger with the mold is not essential to the present invention but I have shown the member E resiliently suspended by springs G at the four corners, said springs being anchored to a plate H and the plunger being depressed by a rod I extending downward centrally through the plate H.

What I claim as my invention is:

1. An apparatus for bending glass to a predetermined double curvature in transverse planes comprising a supporting member having marginal portions of greater dimensions than the finished article and of the desired concave curvature longitudinally and transversely, and a member of corresponding double curvature for clamping the marginal portions of a plastic blank to the marginal portions of said support.

2. An apparatus for bending glass to a predetermined double curvature in transverse planes comprising a support having marginal portions of greater dimensions than the finished article and concave longitudinally and transversely to the desired curvatures, and a plunger member of corresponding curvature provided with a heat insulating surface, and means for actuating said plunger to clamp a plastic blank to the margin of the support and to conform the central portion of the blank to the curvature of the marginal portion thereof.

In testimony whereof I affix my signature.

RALPH C. THOMPSON.